United States Patent
Bryan-Brown et al.

(10) Patent No.: US 6,577,363 B1
(45) Date of Patent: *Jun. 10, 2003

(54) LIQUID CRYSTAL DEVICE

(75) Inventors: Guy P Bryan-Brown, Malvern (GB); Ian C Sage, Malvern (GB); Emma L Wood, Malvern (GB)

(73) Assignee: Qinetiq Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/381,505

(22) PCT Filed: Jun. 19, 1998

(86) PCT No.: PCT/GB98/01812

§ 371 (c)(1), (2), (4) Date: Sep. 21, 1999

(87) PCT Pub. No.: WO98/59275

PCT Pub. Date: Dec. 30, 1998

(30) Foreign Application Priority Data

Jun. 23, 1997 (GB) ............................................. 9713164

(51) Int. Cl.$^7$ ...................... G02F 1/1336; G02F 1/1337
(52) U.S. Cl. ...................... 349/117; 349/119; 349/128; 349/129; 349/130; 349/178
(58) Field of Search ................................ 349/117, 118, 349/119, 128, 129, 130, 132, 160, 178

(56) References Cited

U.S. PATENT DOCUMENTS 5,231,522 A    7/1993  Sumiyoshi
5,380,459 A *  1/1995  Kanemoto et al. ..... 252/299.01

FOREIGN PATENT DOCUMENTS

| WO | WO 96/10774 | 4/1996 |
| WO | WO 97/14990 | 4/1997 |
| WO | WO 97/39382 | 10/1997 |

OTHER PUBLICATIONS

Ohgawara et al "A color STN display with Two retardation compensating Films"—SID 89 Digest—pp. 390–393–May 1989.*

* cited by examiner

Primary Examiner—Robert H. Kim
Assistant Examiner—Tai Duong
(74) Attorney, Agent, or Firm—Nixon & Vanderhye P.C.

(57) ABSTRACT

A liquid crystal device comprises a cell (1) formed by a layer (2) of nematic or long pitch cholesteric liquid crystal material contained between two cell walls (3, 4). One wall (4) carries a surface treatment giving a first azimuthal alignment direction with or without a surface pretilt to liquid crystal molecules. The other wall (3) carries a surface treatment capable of separately providing both a preferred, substantially homeotropic alignment of the adjacent liquid crystal, and a defined azimuthal second alignment direction to the adjacent liquid crystal dependant upon liquid crystal molecular arrangement. The first and second alignment directions are approximately orthogonal. Polarisers (13, 14) may be arranged on either side of the cells walls with their polarization axes parallel or perpendicular to the two azimuthal directions. In addition one or more birefringent compensator layers (19, 20) are disposed on one side or on both sides of the cell (1). The compensator layers (19, 20) may be formed of aligned polymer layers, or aligned liquid crystal material, either in a liquid form in a cell, or dispersed in a polymer sheet, or sheets of quartz or calcite slices. The device operates between two different voltage levels, one level ($V_1$) providing a non twisted liquid crystal molecular arrangement, the other and higher voltage ($V_2$) providing a twisted molecular arrangement.

16 Claims, 12 Drawing Sheets

LIQUID CRYSTAL DEVICE

BACKGROUND OF THE INVENTION

1. Field of the Invention

This invention relates to the alignment and switching of nematic liquid crystal devices.

2. Discussion of Prior Art

Liquid crystal (LC) devices typically comprise of a thin layer of a liquid crystal material contained between cell walls. Optically transparent electrode structures on the walls allow an electric field to be applied across the layer causing a re-ordering of the liquid crystal molecules.

There are three known types of liquid crystal material nematic, cholesteric and smectic each having different molecular ordering. The present invention concerns devices using nematic materials.

In order to provide displays with a large number of addressable elements it is common to make the electrodes as a series of row electrodes on one wall and a series of column electrodes on the other cell wall. These form e.g. an x,y matrix of addressable elements or pixels and for twisted nematic types of device are commonly addressed using rms addressing methods.

Twisted nematic (TN) and phase change devices are switched to an ON state by application of a suitable voltage and allowed to switch to an OFF state when the applied voltage falls below a lower voltage level, i.e. these devices are monostable. For a twisted nematic type of device (90° or 270° twist as in U.S. Pat. No. 4,596,446) the number of elements that can be rms addressed is limited by the steepness of a device transmission verses voltage curve (as described by Alt and Pleschko in IEEE Trans Ed vol ED 21, (1974) P.146–155). One way of improving the number of pixels is to incorporate thin film transistors adjacent to each pixel: such displays are termed active matrix displays. An advantage of nematic types of devices is the relatively low voltage requirements. They are also mechanically stable and have a wide temperature operating range. This allows construction of small and portable battery powered displays.

The main disadvantages of the above devices are as follows. The 90° twisted nematic has a poor viewing angle characteristic which leads to loss of contrast when the device is viewed at high incident angles in certain azimuthal directions. Furthermore greyscale inversion occurs in these orientations. The low steepness of the 90° twisted nematic can be improved by increasing the twist angle to 180°–270°. However this generally leads to no improvement in viewing angle characteristic. Both types of device also suffer from the fact that the large difference in the nematic tilt between the on and off states leads to a change in pixel capacitance which can cause crosstalk problems with other pixels.

SUMMARY OF THE INVENTION

Figure 3:
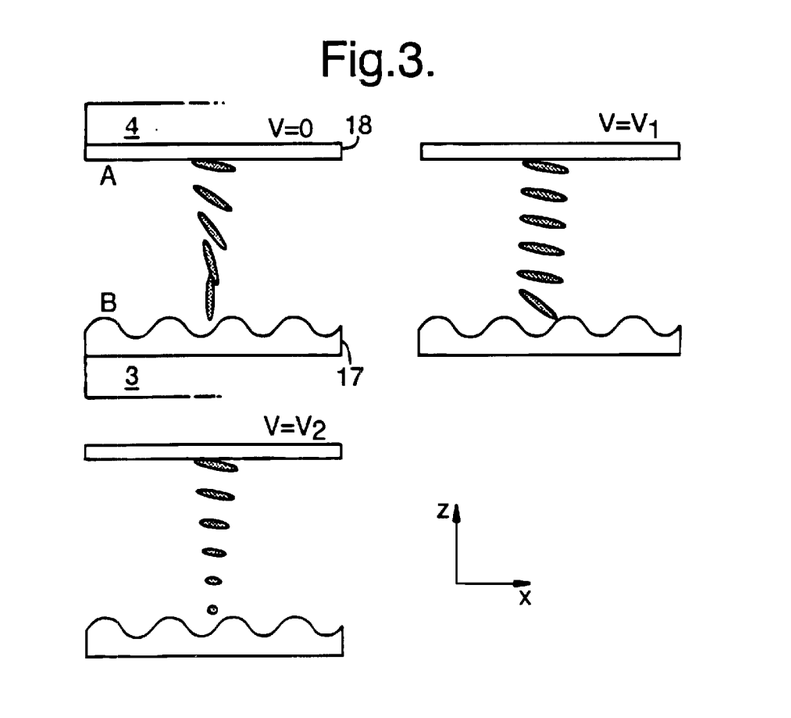
FIG. 3 shows the principle of the VCT operation as described in PCT/GB97/01019.

The above disadvantages can be overcome by using a voltage controlled twist configuration which was first described in GB96/07854 and PCT/GB97/01019. This device uses a surface which can induce a voltage dependent twisting torque. One example of the VCT configuration is shown in FIG. 3. In this example the configurations at an applied voltage of zero or $V_1$ will both appear dark when the cell is placed between crossed polarisers oriented along the x and y axes. At $V_2$ the twist in the cell leads to guiding of the light and so this state will be bright between crossed polarisers. In order to achieve to achieve high contrast across a wide viewing angle, the dark state (at $V_1$) should have a very low transmission regardless of viewing orientation. The optimum liquid crystal configuration to obtain this property is a planar non twisted structure in which the tilt angle is low throughout the thickness of the cell. The structure at $V_1$ is closer to this optimum than that shown at zero volts. Unfortunately a fully planar non twisted state is only obtained if the groove depth of the grating is small as this will delay the onset of twist to much higher voltages. However low voltage operation is preferred especially for active matrix applications to allow low power operation and compatability with low cost electronics. In order to achieve low voltage operation with the VCT, the twist threshold must occur at low voltage which means that significant splay will exist in the dark state. In the worst case the system will switch directly from a hybrid state (V=0 in FIG. 3) to the twisted state at $V_2$.

According to this invention the viewing of a non-optimum VCT can be improved by adding one or more birefringent layers disposed on one side or on both sides of the cell. Birefringent layers have been used (EP-0686869, EP-0676660, EP-0622656) for symmetric liquid crystal configurations, eg twisted nematic devices. However, the VCT is a hybrid configuration in which conventional arrangements of compensating layers would not be expected to be effective.

According to this invention an improved VCT liquid crystal device comprises:

a nematic or chiral nematic liquid crystal material of negative dielectric anisotropy;

two containing cell walls, spaced apart by spacers and carrying electrodes or other means to impose a field on the liquid crystal layer;

an aligning surface treatment at one cell wall providing a substantially planar alignment of the liquid crystal with a defined azimuthal alignment direction;

an aligning surface treatment on the second cell wall providing a preferred, substantially homeotropic alignment of the adjacent liquid crystal material, and also provides a defined azimuthal alignment direction to the adjacent liquid crystal, when said liquid crystal near the second cell wall is caused to depart significantly from the said preferred, substantially homeotropic alignment.

means to cause optical modulation of light passing through the device;

CHARACTERISED BY one or more birefringent compensator layers disposed adjacent one or on both cell walls in order to improve the viewing characteristics of the display.

The retardation of the compensator layers may have the same, greater, or smaller retardation than that of the liquid crystal material.

The birefringent compensator layers may be films of polymer rendered birefringent, for example, by a controlled stretching process (Y Fujimura, et al SID 92 Digest p.397 (1992)). Alternatively the birefringent layers may comprise a further cell filled with a liquid crystal composition together with the necessary surface treatments to impose a defined state of alignment. Optionally a field may be applied to such a cell to further control its state of alignment. Alternatively the birefringent layer may comprise an aligned liquid crystal polymer film (e.g. S. T. WU, SID Applications Digest p.21 (1996)). Other known materials and their combinations such as quartz or calcite slices, or oblique evaporants (e.g. J. P. Eblem et al SID 97 Digest p.683 (1977)), may be also used.

The electrodes may be formed as a series of row and column electrodes arranged and an x,y matrix of addressable elements or display pixels. Typically, the electrodes are 200 mm wide spaced 20 mm apart.

Alternatively, the electrodes may be arranged in other display formats e.g. r-θ matrix or 7 or 8 bar displays.

BRIEF DESCRIPTION OF THE DRAWINGS

The invention will now be described, by way of example only with reference to the accompanying drawings of which.

DETAILED DISCUSSION OF EMBODIMENTS

Figure 1:
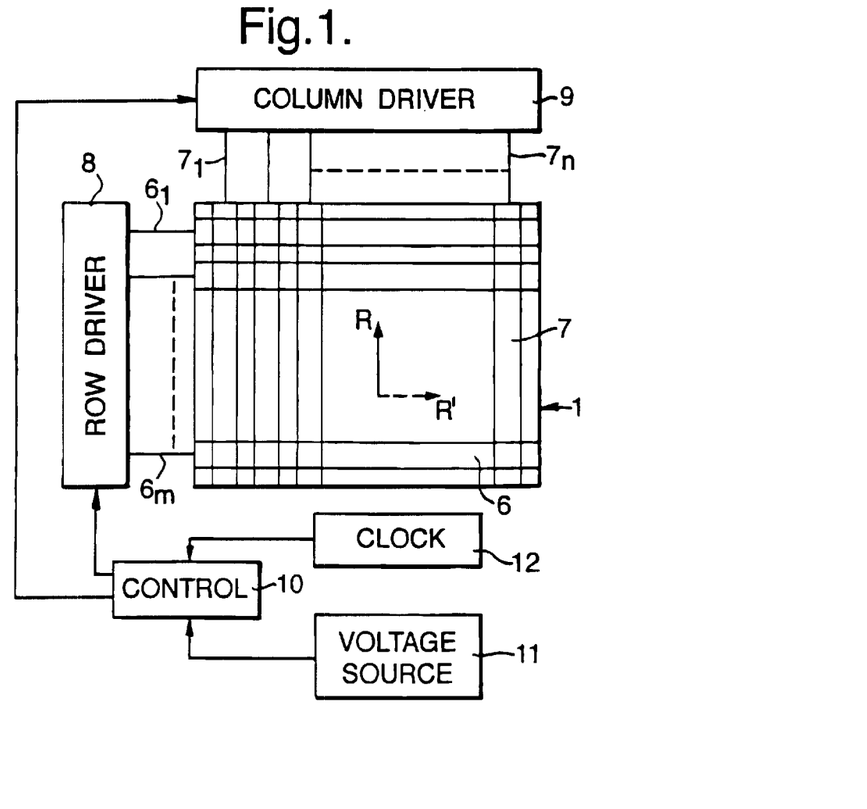
FIG. 1 is a plan view of a matrix multiplexed addressed liquid crystal display.
Figure 2:
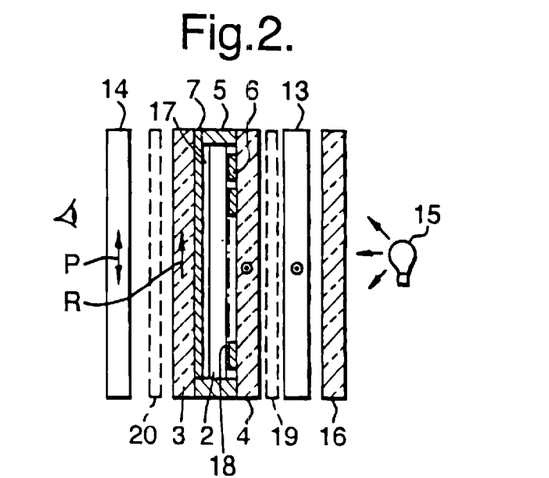
FIG. 2 is a cross section of the display of FIG. 1.

The display in FIGS. 1, 2 comprise a liquid crystal cell 1 formed by a layer 2 of nematic or long pitch cholesteric liquid crystal material of negative dielectric anisotropy contained between glass walls 3, 4. A spacer ring 5 maintains the walls typically 1–6 μm apart. Additionally numerous beads of the same dimensions may be dispersed within the liquid crystal to maintain an accurate wall spacing. Strip like row electrodes 6, e.g. of $SnO_2$ or ITO are formed on one wall 3 and similar column electrodes 7 are formed on the other wall 4. With m-row and n-column electrodes this forms an m×n matrix of addressable elements or pixels. Each pixel is formed by the intersection of a row and column electrode.

A row driver 8 supplies voltage to each row electrode 6. Similarly a column driver 9 supplies voltages to each column electrode 7. Control of applied voltages is from a control logic 10 which receives power from a voltage source 11 and timing from a clock 12.

Either side of the cell 1 are polarisers 13, 14 arranged with their polarisation axis substantially crossed with respect to one another and substantially parallel to the alignment directions, if any, on the adjacent wall 3, 4 as described later. Additionally, one or more compensation layers 19, 20 of e.g. stretched polymer are arranged between a cell wall under a polariser (if used) as described more fully later.

A partly reflecting mirror 16 may be arranged behind the cell 1 together with a light source 15. These allow the display to be seen in reflection and lit from behind in dull ambient lighting. For a transmission device, the mirror may be omitted.

Prior to assembly, one of the cell walls 3, 4 has formed thereon a grating layer 17 which is treated eg by lecithin give a homeotropic orientation. The other surface is treated to give a substantially planar surface with a preferred alignment direction, eg a rubbed layer 18 of PI-32 (Ciba Geigy) or a polyimide. This provides a tilted homogeneous alignment treatment in which the surface tilt (or pretilt) is typically 2–15°.

The grating may be a profiled layer of a photopolymer formed by a photolithographic process e.g. M C Hutley, Diffraction Gratings (Academic Press, London 1982) p 95–125; and F Horn, Physics World, 33 (March 1993). Alternatively, the bigrating may be formed by embossing; M T Gale, J Kane and K Knop, J App. Photo Eng. 4, 2, 41 (1978), or ruling: E G Loewen and R S Wiley, Proc SPIE, 88 (1987), or by transfer from a carrier layer.

The grating may be produced as described in PCT/GB97/01019. For example the grating on wall 3 was fabricated into Shipley 1805 photoresist by contact photolithography using a chrome on glass mask with a pitch of 1 μm (0.5 μm lines, 0.5 μm gaps). Adjustment of the exposure time allowed different groove depths to be obtained. In this case a mercury lamp source was used with an intensity of 0.5 $mW/cm^2$. Development was carried out in Shipley MF319 for 10 seconds followed by a water rinse. Finally the grating was exposed to deep UV and baked at 160° C. to ensure insolubility in the liquid crystal. Prior to cell construction, the grating surface was treated with a lecithin solution in order to induce a homeotropic surface.

Finally the cells is filled with a nematic material which may be e.g. EN38 (Chisso) or ZLI-4788 (Merck).

The principle of operation of a VCT device is now described with reference to FIG. 3.

The bottom surface is the alignment layer 18 on wall 4 (no shown) which induces a pretilted planar alignment (in the x direction) while the upper surface is a grating layer 17 on wall 3 (not shown) surface coated with a surfactant to induce a homeotropic orientation. The grating grooves point in the y direction.

At voltage V=0, a hybrid director profile exists as shown in FIG. 3a. When the voltage is raised to $V_1$, the tilt of the nematic (with $\Delta\epsilon<0$) lowers throughout the thickness of the cell except close to the grating surface where it remains high due to the homeotropic treatment FIG. 3b. At a higher voltage ($V_2$), the nematic very close to (or even within) the grating process is driven into a planar orientation FIG. 3c. Once this occurs, the director near the surface will encounter the azimuthal anchoring force of the grating 17 and will twist around to follow the groove direction (y axis). Thus a twisted structure is formed.

The two states are made optically distinct by placing the cell between crossed polarisers 13, 14 (FIGS. 1,2) with their transmission axes along the x and y directions. In this case, the configurations at V=0 and $V_1$ will appear black while at $V_2$ at light state is observed.

As with conventional TN structures, the maximum transmission is obtained when N is an integer where:

$$N=\sqrt{(\Delta nd/\lambda)^2+0.25}$$

where $\Delta n$ is the nematic birefringence, d is the cell gap and $\lambda$ is the operating wavelength. Similarly a normally black mode can be obtained by using parallel polarisers along either the x or y direction.

The optical contrast is obtained using voltages between $V_1$ and $V_2$. In this range the nematic director is substantially planar and so the black and white states as well as intermediate gray levels are obtained with improved and symmetric viewing angle characteristics. Variation of the grating groove depth influences the voltage at which the transition to a twisted state occurs. A higher transition voltage ensures a fully planar structure.

Figure 4A:
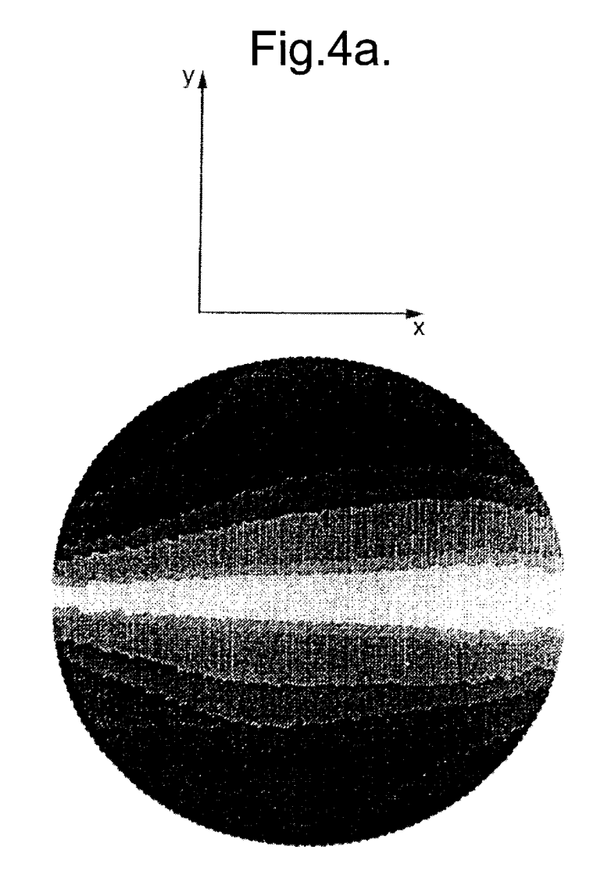
FIGS. 4a–4b show the isocontrast (a) and the dark state transmission (b) polar plots for a worst case uncompensated VCT cell.

The operation of a (worst case) VCT without compensator layer is now considered. The dark state is assumed to be the configuration shown in FIG. 3 at zero volts and the light state is the configuration shown at $V_2$. Therefore we assume that the cell switches directly from a hybrid non-twisted state to a planar twisted state. FIG. 4a shows the theoretical isocontrast contours obtained by dividing the optical throughput at $V_2$ by the optical throughput at zero volts. The plot shows the contrast ratio for an incident angle range of 0–60° (external angle to the cell defined from the z axis) and for azimuthal angles of 0–360° (defined from the x-axis). The LC layer is assumed to be 5 $\mu$m thick with refractive indices. $n_0=1.474$, $n_c=1.557$. Starting with the darkest region the contrast contours cover the following ranges:

<1:1
5:1–1:1
10:1–5:1
50:1–10:1
100:1–50:1
>100:1

Thus in the horizontal direction in FIG. 4 (which corresponds to the x direction in FIG. 3) the region area of contrast region greater than 10:1 covers the entire −60° to +60° range. However in the vertical (y direction) this contrast only extends from −21° to +21°.

Figure 4B:
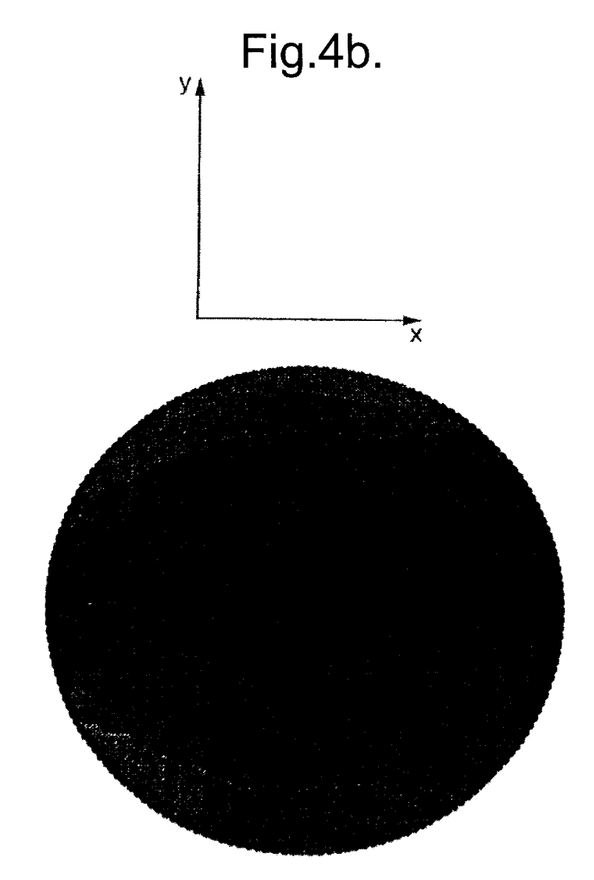

FIG. 4b shows the transmission of the dark state (zero volts) for this configuration. In this case the contours starting with the darkest region correspond to the normalised transmission between crossed polarisers in the ranges:

0.00–0.05
0.05–0.10
0.15–0.20
0.25–0.30
0.35–0.40
0.45–0.50

The highest transmission is 0.5 as the first polariser absorbs half the incident radiation.

It can be seen that the outer region of FIG. 4b fall in the 0.35–0.40 range which explains why the contrast in FIG. 4a is poor. In order to improve the contrast ratio the region of very dark transmission must be broadened to the largest possible incident angle.

Several ways are now considered for maintaining high contrast ratio at all viewing angles by adding birefringent compensator layers to this VCT device.

EXAMPLE 1

Figure 5:
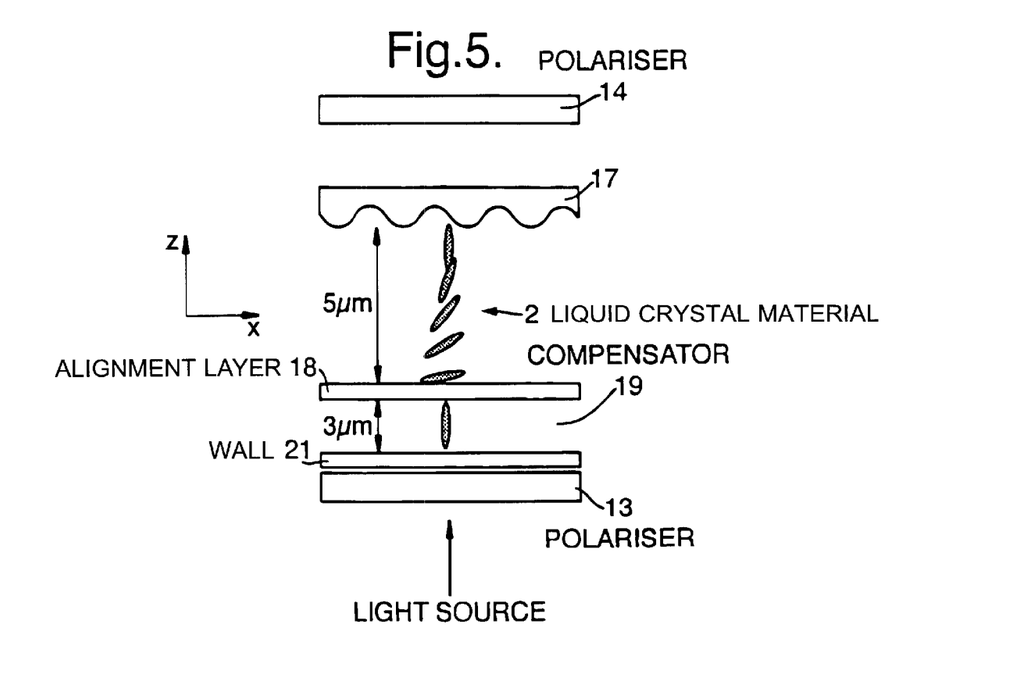
FIG. 5 shows the schematic configuration for VCT compensation using a single uniaxial layer with its optic axis in the Z direction.

FIG. 5 shows a schematic of a modified configuration in which a 3 $\mu$m positive uniaxial compensator layer 19 between wall 4 (not shown) and wall 21 is adjacent to the alignment layer 18; eg a layer from Nitto Denko Japan in their NRF series. The compensator layer 19 has an optical axis along z and has the same birefringence as the liquid crystal material 2. Polariser 13 has its optical axis along the x-axis, whilst the polariser 14 has its optical axis along the y-axis.

Figure 6A:
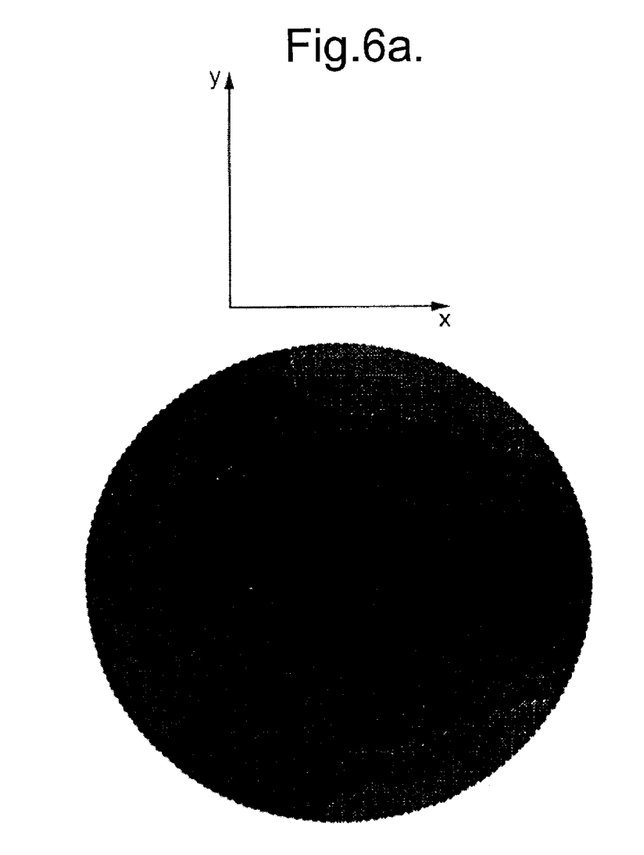
FIGS. 6a–6b show the dark transmission (a) and isocontrast (b) planar plots for a VCT cell compensated in the manner shown in FIG. 5.
Figure 6B:
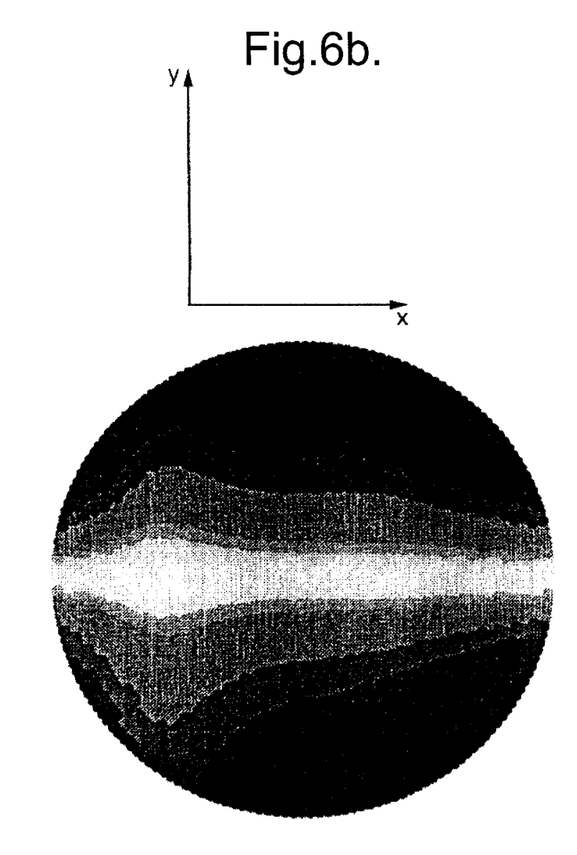

FIG. 6a shows the dark (zero volts) transmission which still has regions in the 0.35–0.40 range but has a larger region in the range 0.00–0.05 which compared to FIG. 4a. This leads to a larger viewing region with a contrast ratio greater than 10:1 as shown in FIG. 6b.

EXAMPLE 2

Figure 7:
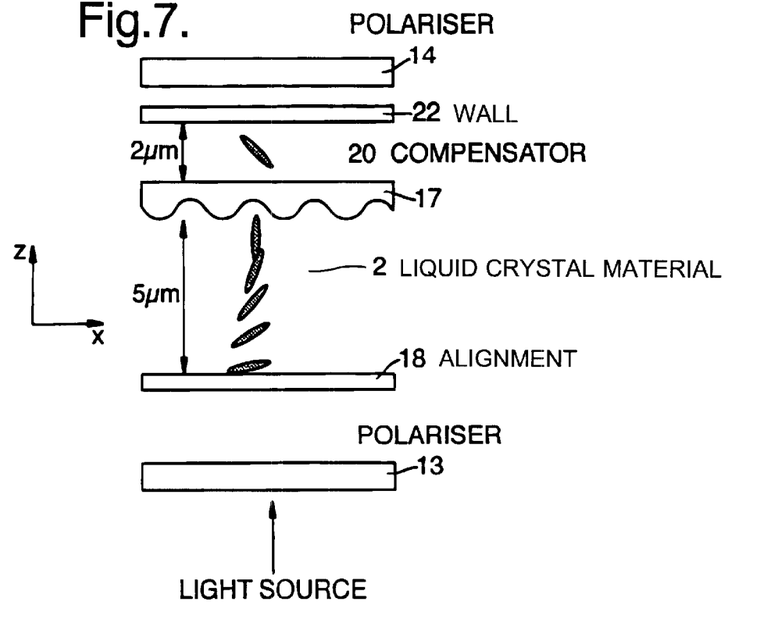
FIG. 7 shows the schematic configuration for VCT compensation using a single positive uniaxial layer with its optic axis at 45° to the Z direction in the x-z plane

FIG. 7 shows another example where a 2 $\mu$m positive uniaxial compensator layer 20 has been added between the grating layer 17 and wall 22. In this case the compensator layer 20 has an optical axis tilted at 45° to z in the x-z plane (tilt direction as shown) and has the same birefringence as the liquid crystal.

Figure 8A:
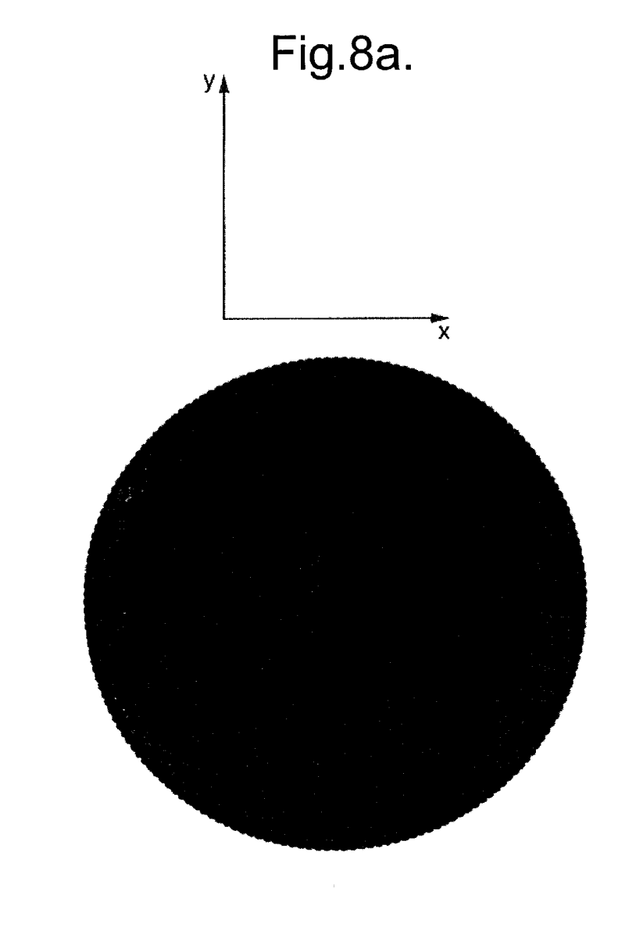
FIGS. 8a–8b show the dark transmission (a) and isocontrast (b) polar plots for a VCT cell compensated in the manner shown in FIG. 7.
Figure 8B:
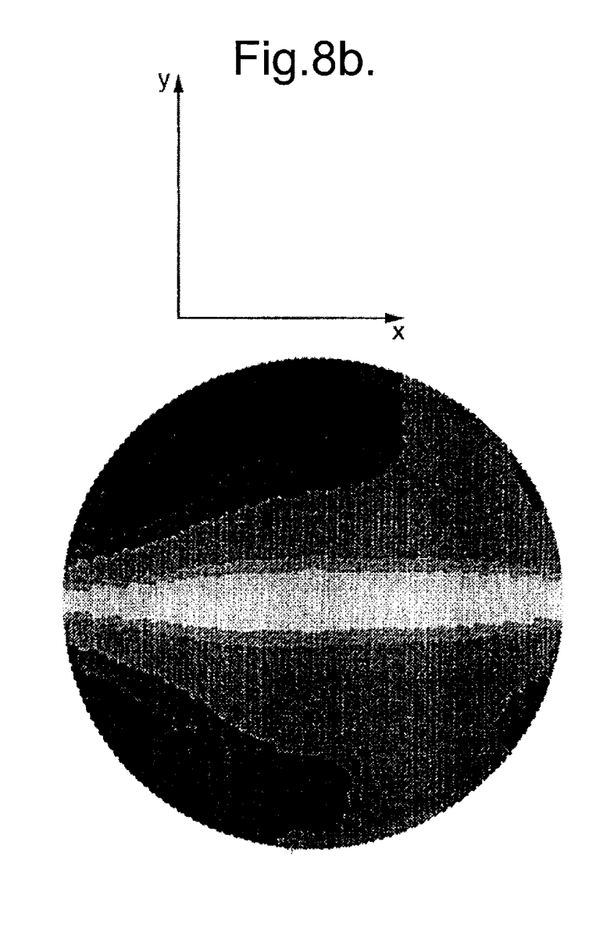

FIG. 8a shows the dark state (zero volts) transmission which shows that a large portion of the viewing cone now lies in the 0.0–0.05 range. The isocontrast plot (FIG. 8b) shows a >10:1 region that extends from −37.5° to +27.8° which is larger than the uncompensated case. The contrast is also high in two of the diagonal viewing directions.

EXAMPLE 3

Figure 9:
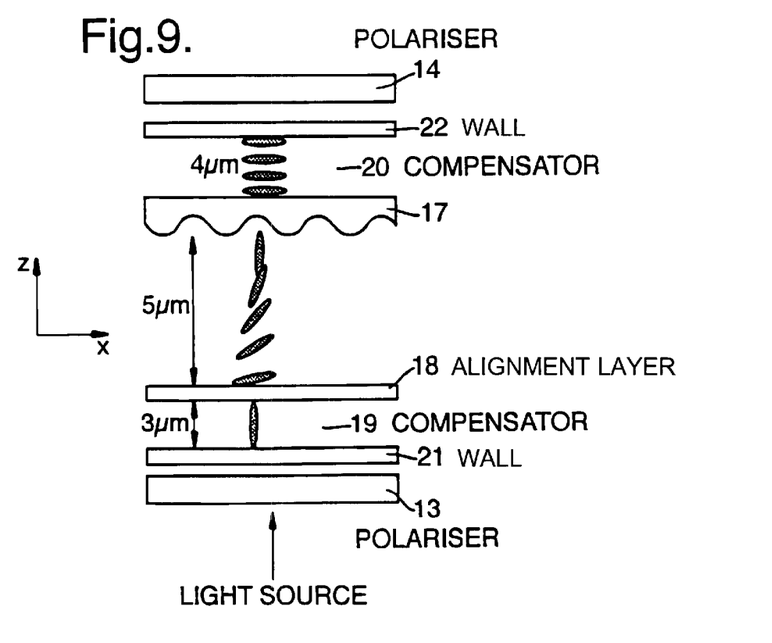
FIG. 9 shows the schematic configuration for VCT compensation using two positive uniaxial layers placed on either side of the LC, one layer with its optic axis in the z direction and the other with its axis in the x direction.

In this example, 2 birefringent compensator layers 19, 20 are arranged adjacent the alignment layer 18 and the grating layer 17 as shown in FIG. 9. The compensator 19 is a 3 $\mu$m thick positive uniaxial layer with its optical axis in the z direction. The compensator 20 is a 4 $\mu$m thick positive uniaxial layer with its optical axis in the x direction. Both layers 19, 20 have the same birefringence as the liquid crystal material 2.

Figure 10A:
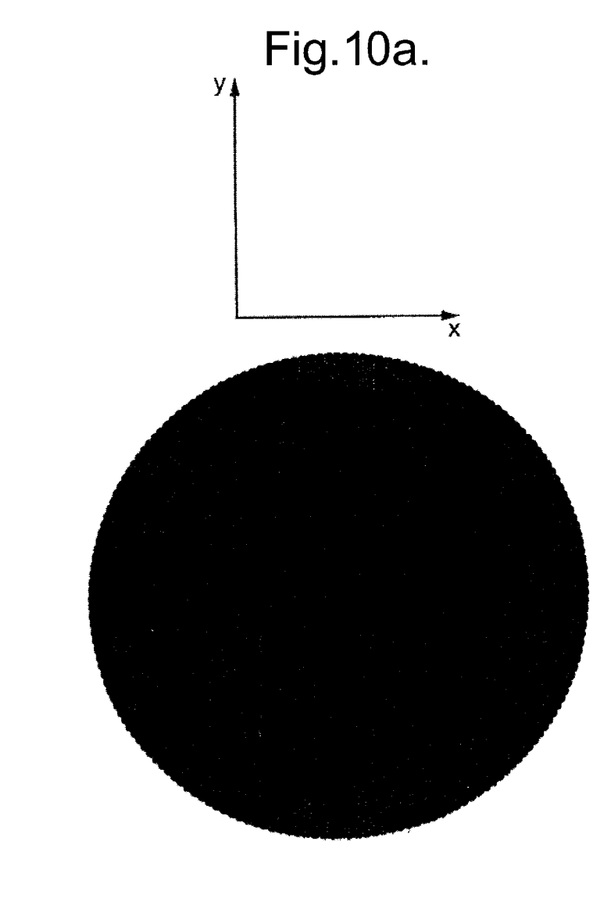
FIGS. 10a–10b show the dark state transmission (a) and isocontrast (b) polar plots for a VCT cell compensated in the manner shown in FIG. 9.
Figure 10B:
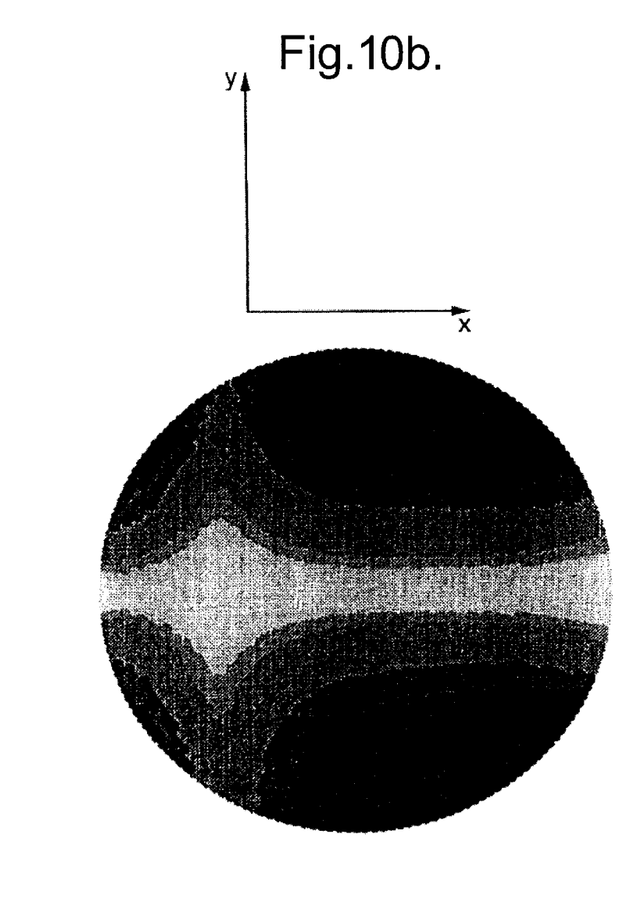

FIG. 10a shows the transmission in the dark (zero volts) state. The region in the range of 0.0–0.05 is larger than the uncompensated case and FIG. 10b shows that the contrast extends across a wider region.

EXAMPLE 4

Figure 11:
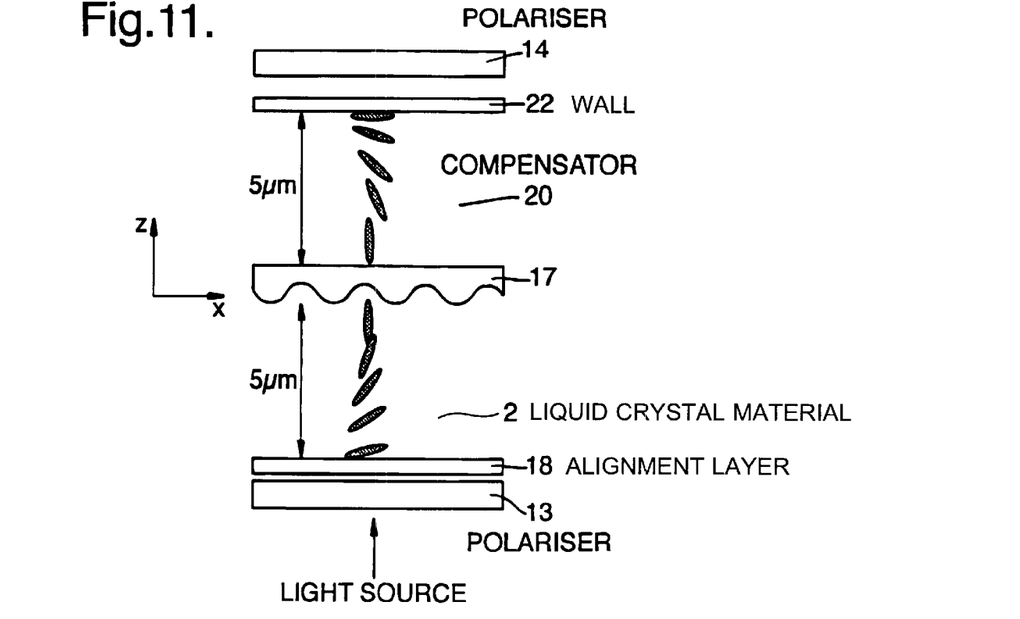
FIG. 11 shows the schematic configuration for VCT compensation using a positive uniaxial layer whose optic axis varies in orientation through the thickness of the layer.

In this example one birefringent compensator layer 20 is arranged adjacent the grating layer 17 and has an optic axis which varies through the thickness of the layer as shown in FIG. 11. The axis tilts from 0° to 90° in such a way that tilt is proportional to z position. The layer thickness is 5 $\mu$m and the material has the same optical birefringence as the liquid crystal material 2.

Figure 12A:
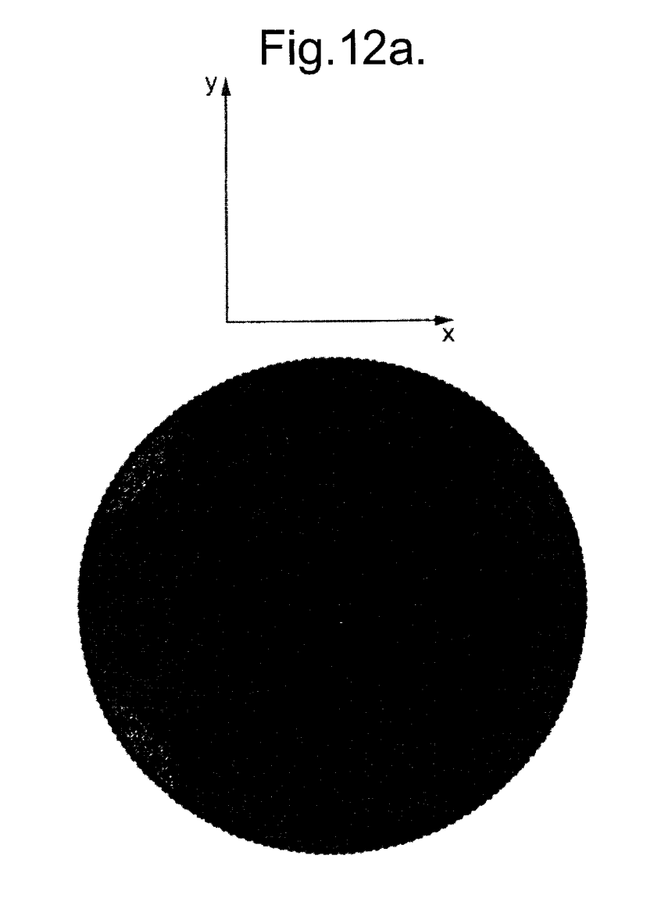
FIGS. 12a–12b show the dark state transmission (a) and isocontrast (b) polar plots for a VCT cell compensated in the manner shown in FIG. 11.
Figure 12B:
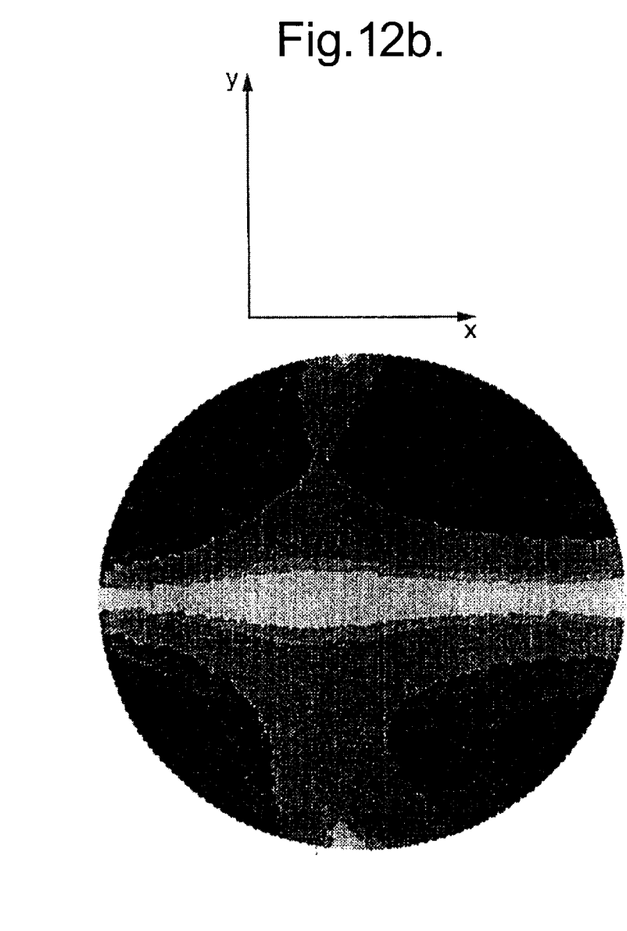

FIG. 12a shows that the dark transmission of 0.0–0.05 extends in a large cross shaped region from −60° to +60° in both the x and y directions. The isocontrast plot (FIG. 12b) shows that the region of >10:1 also extends to ±60° in both directions. Hence this type of compensation has lead to significant improvement.

EXAMPLE 5

Figure 13:
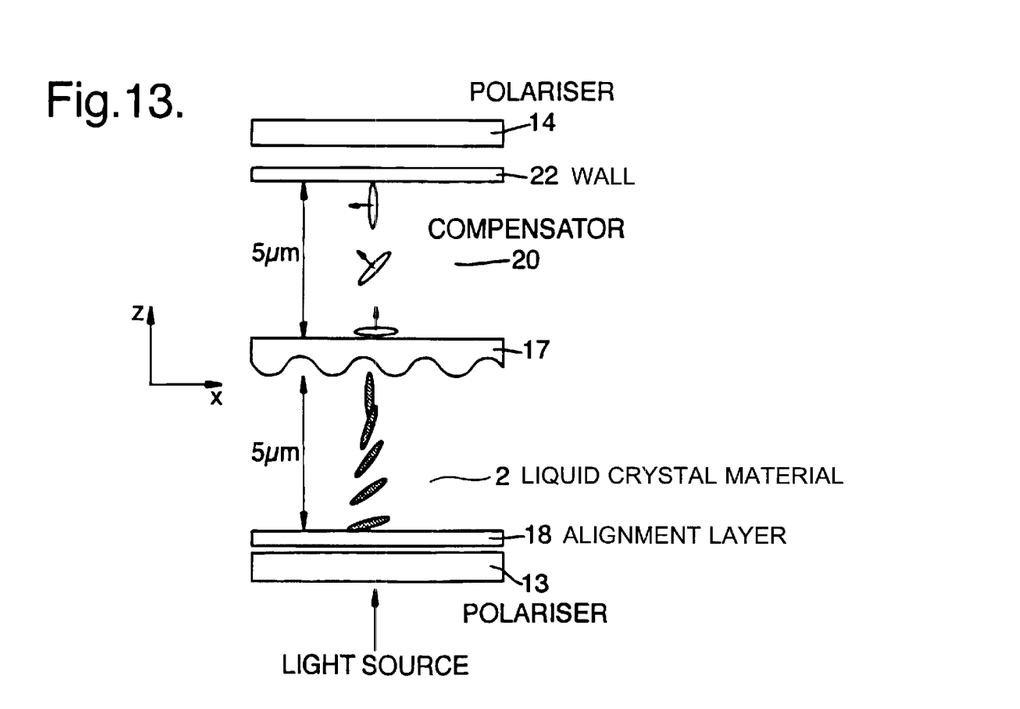
FIG. 13 shows the schematic configuration for VCT compensation using a negative uniaxial layer whose optic axis varies in orientation through the thickness of the layer.

FIG. 13, in this example a birefringent compensator layer 20 is arranged adjacent the grating layer 17 and is a 5 $\mu$m negative uniaxial layer with its optic axis represented by the arrows in FIG. 13. This axis tilts from 0° to 90° through the thickness of the layer in a linear manner. The birefringence of this compensator layer 20 has the same value as the liquid crystal material 2 but is opposite in sign.

Figure 14A:
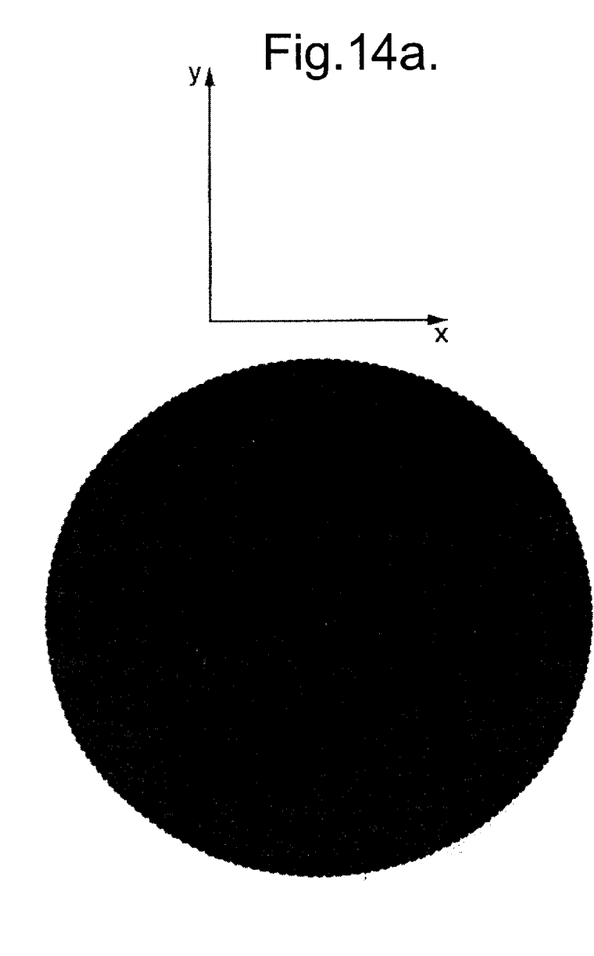
FIGS. 14a–14b show the dark state transmission (a) and isocontrast (b) polar plots for a VCT cell compensated in the manner shown in FIG. 13.
Figure 14B:
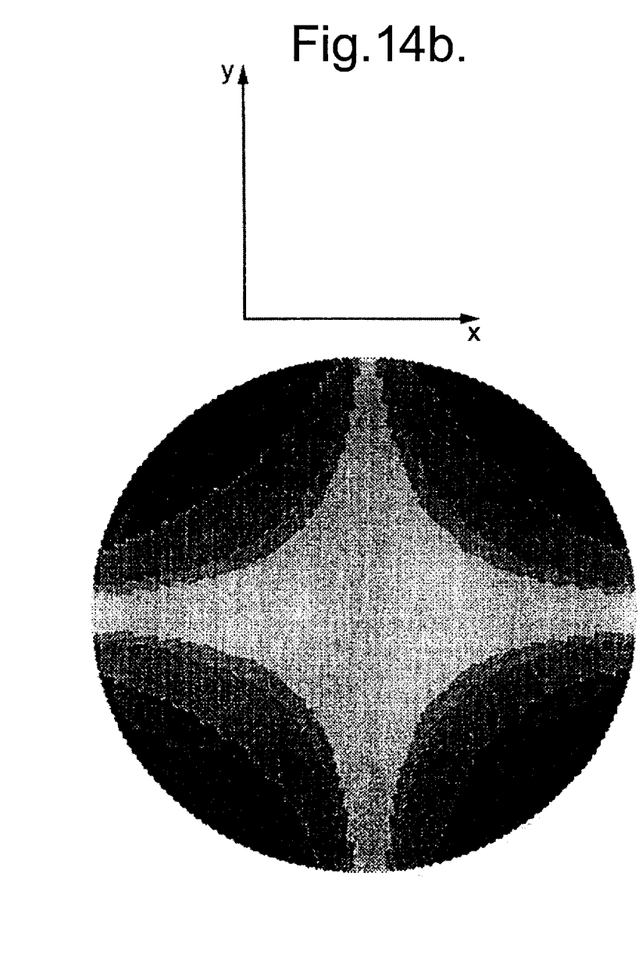

FIG. 14a shows an excellent dark state with the majority of the viewing cone having a transmission less than 0.05. The viewing characteristics also show very good symmetry. The corresponding isocontrast plot (FIG. 14b) shows a very high contrast of >100:1 extending from −60° to +60° in both the x and y directions. The viewing is also good in the diagonal directions with the contrast ratio remaining greater than 10:1 as far as 43° in all quadrants.

EXAMPLE 6

Figure 15:
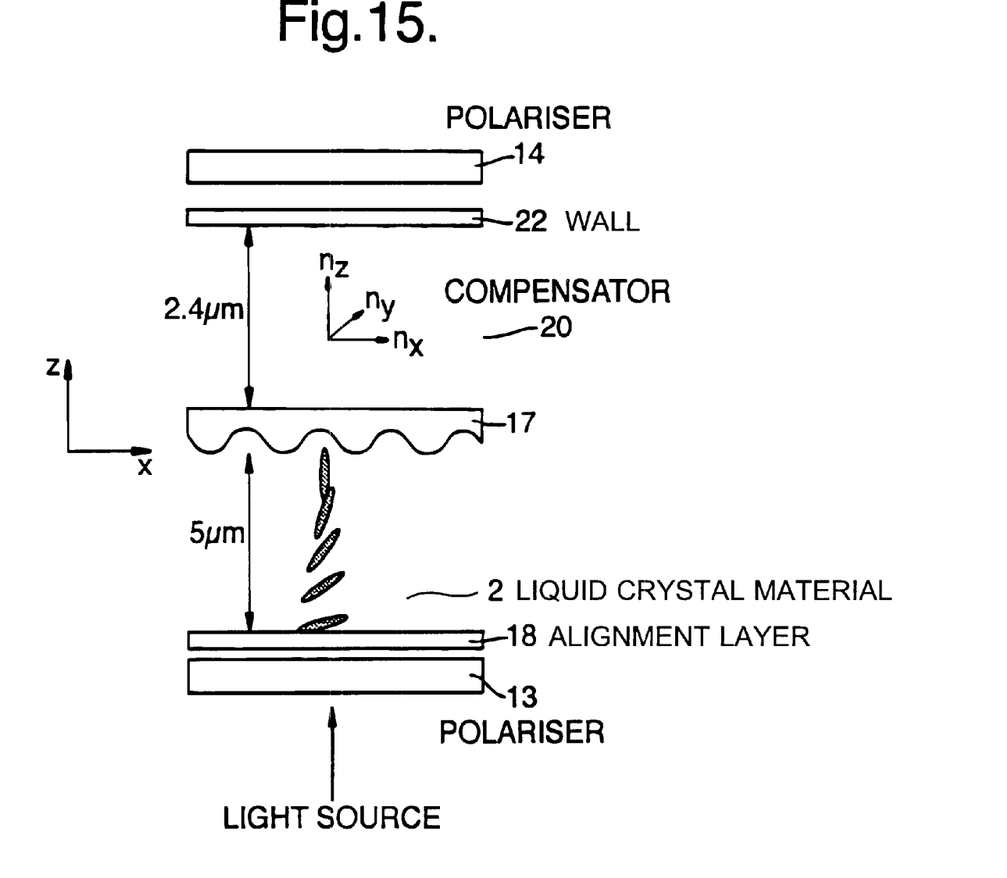
FIG. 15 shows the schematic configuration for VCT compensation using a single biaxial layer with its optic axes aligned with the x, y and z directions.

In this FIG. 15 example a biaxial compensator layer 20 adjacent the grating 17 has been used for compensation: eg a layer from Nitto Denko Japan in their NFZ series. The compensation layer 20 is 2.4 μm thick and has refractive indices $n_x=1.508$, $n_y=1.558$ and $n_z=1.475$.

Figure 16A:
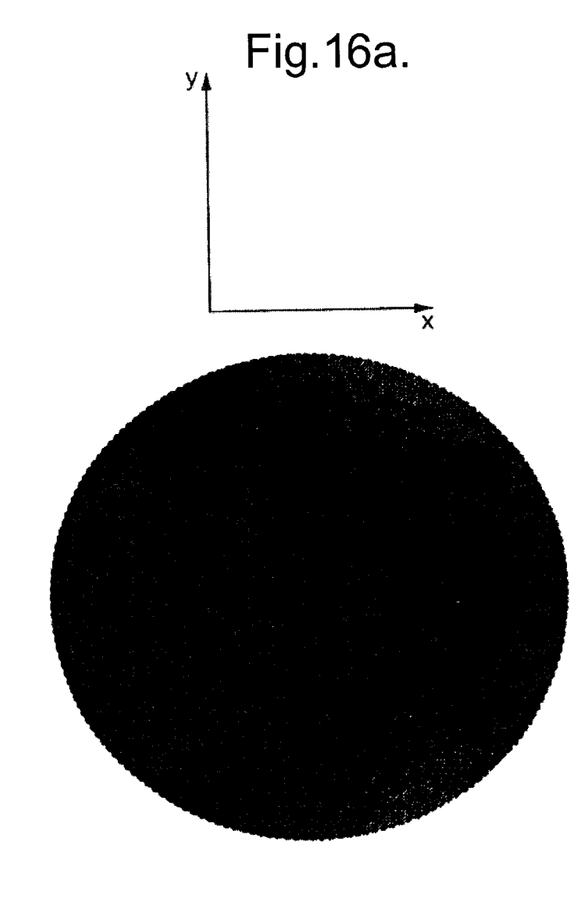
FIGS. 16a–16b show the dark state transmission (a) and isocontrast (b) polar plots for a VCT cell compensated in the manner shown in FIG. 15.
Figure 16B:
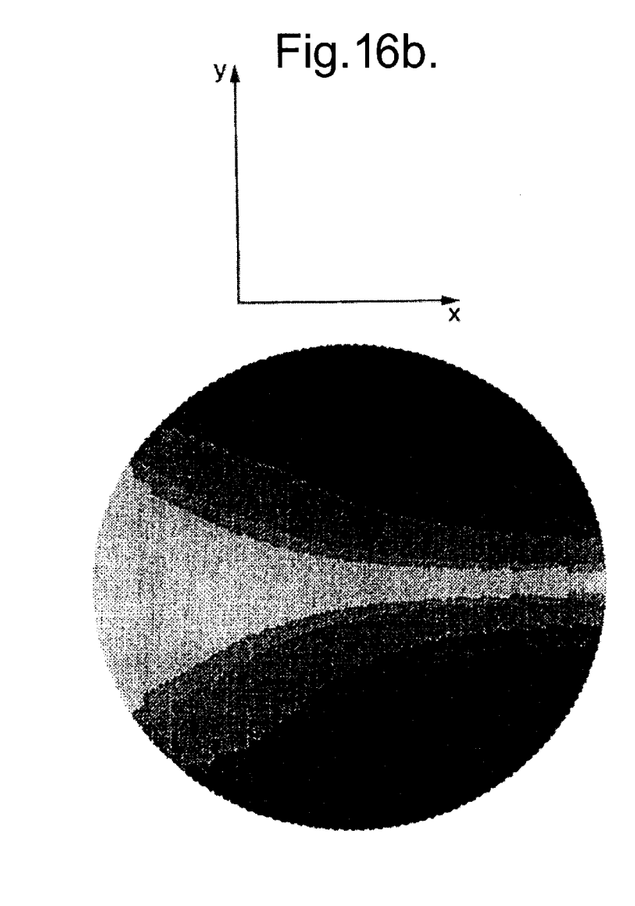

In this case the dark state transmission (FIG. 16a) is not as good as example 5 but the 0.0–0.05 contour is still improved in some regions compared to the uncompensated case. The isocontrast plot (FIG. 16b) also shows a wider region of high contrast in the negative x direction compared to the uncompensated case.

In summary the above examples have shown the viewing characteristics of the VCT mode can be improved by adding one or more birefringence layers. These layers compensate the variation in transmission which occurs when the VCT is viewed from different incident and azimuthal angles. In these cases the worst case VCT has been chosen. In many cases the uncompensated VCT can have must better viewing (see GB97/01019) but at the expense of higher voltage operation. Compensation of an intermediate voltage VCT will lead to even better viewing characteristics than those shown in the above examples. This is because the nematic director can achieve a lower average tilt through the thickness of the cell before the twist threshold occurs.

The compensation layers can be made from a wide variety of materials. In the above examples the retardation of the compensation layer has been chosen to be the same as the liquid crystal material; ie Δn.d of the compensator and liquid crystal layer are equal (Δn is nematic birefringence, d is liquid crystal layer thickness), typically Δn.d=0.5 μm. However in practice a thicker layer of lower birefringence (or vice versa) can be used. In all cases the uniaxial or biaxial retardation is the important parameter for the compensation layer. The material should also be chosen to have a wavelength and temperature dispersion of birefringence which matches that of the liquid crystal material. The compensators may be within the range 0.05<Δn.d<5 μm from that of the liquid crystal material layer.

The various compensator layer materials can be used singly or in any suitable combination on either side of the cell.

What is claimed is:

1. An improved VCT liquid crystal device comprising;
   a nematic or chiral nematic liquid crystal material of negative dielectric anisotropy;
   two containing cell walls, spaced apart and carrying electrodes or other means to impose a field on the liquid crystal layer;
   an aligning surface treatment at one cell wall providing a substantially planar alignment of the liquid crystal with a defined azimuthal alignment direction;
   an aligning surface treatment on the second cell wall providing a preferred, substantially homeotropic alignment (z) of the adjacent liquid crystal material, and also providing a defined azimuthal alignment direction (y) to the adjacent liquid crystal, when said liquid crystal near the second cell wall is caused to depart significantly from the said preferred, substantially homeotropic alignment;
   means for distinguishing between two different optical states; and
   one or more birefringent compensator layers disposed adjacent one or on both cell walls in order to improve the viewing characteristics of the display.

2. The device of claim 1 wherein the retardation of a compensator layer is substantially the same as that of the liquid crystal material.

3. The device of claim 1 wherein the retardation of a compensator layer is less than that of the liquid crystal material.

4. The device of claim 1 wherein the retardation of a compensator layer is greater than that of the liquid crystal material.

5. The device of claim 1 wherein the retardation of a compensator layer is in the range 0.05 μm<Δn.d>5 μm.

6. The device of claim 1 wherein the alignment on the second cell wall is a grating structure coated with a homeotropic alignment material and a compensator layer is arranged adjacent to the second cell wall.

7. The device of claim 1 wherein the alignment on the first cell wall is a rubbed polymer layer and a compensator layer is arranged adjacent to the first cell wall.

8. The device of claim 1 comprising two compensator layers, said compensator layers arranged one adjacent each of said cell walls, wherein, the compensator layers are of similar construction to each other.

9. The device of claim 1 comprising two compensator layers, said compensator layers arranged one adjacent each of said cell walls, wherein, the compensator layers are of different construction from each other.

10. The device of claim 1 wherein a birefringent compensator layer is a layer of polymer.

11. The device of claim 1 wherein a birefringent compensator layer is a layer of a liquid crystal material.

12. The device of claim 1 wherein a birefringent compensator layer is a layer of a liquid crystal material contained between cell walls surface treated to align the liquid crystal material.

13. The device of claim 1 wherein a birefringent compensator layer is a layer of a liquid crystal material contained between cell walls surface treated to align the liquid crystal material and provided with electrode structures for applying an electric field to the liquid crystal material.

14. The device of claim 1 wherein a birefringent compensator layer is a layer of aligned liquid crystal polymer material.

15. The device of claim 1 wherein a birefringent compensator layer is a layer of quartz or calcite.

16. The device of claim 1 wherein a birefringent compensator layer is a layer of obliquely evaporated material.

* * * * *